UNITED STATES PATENT OFFICE.

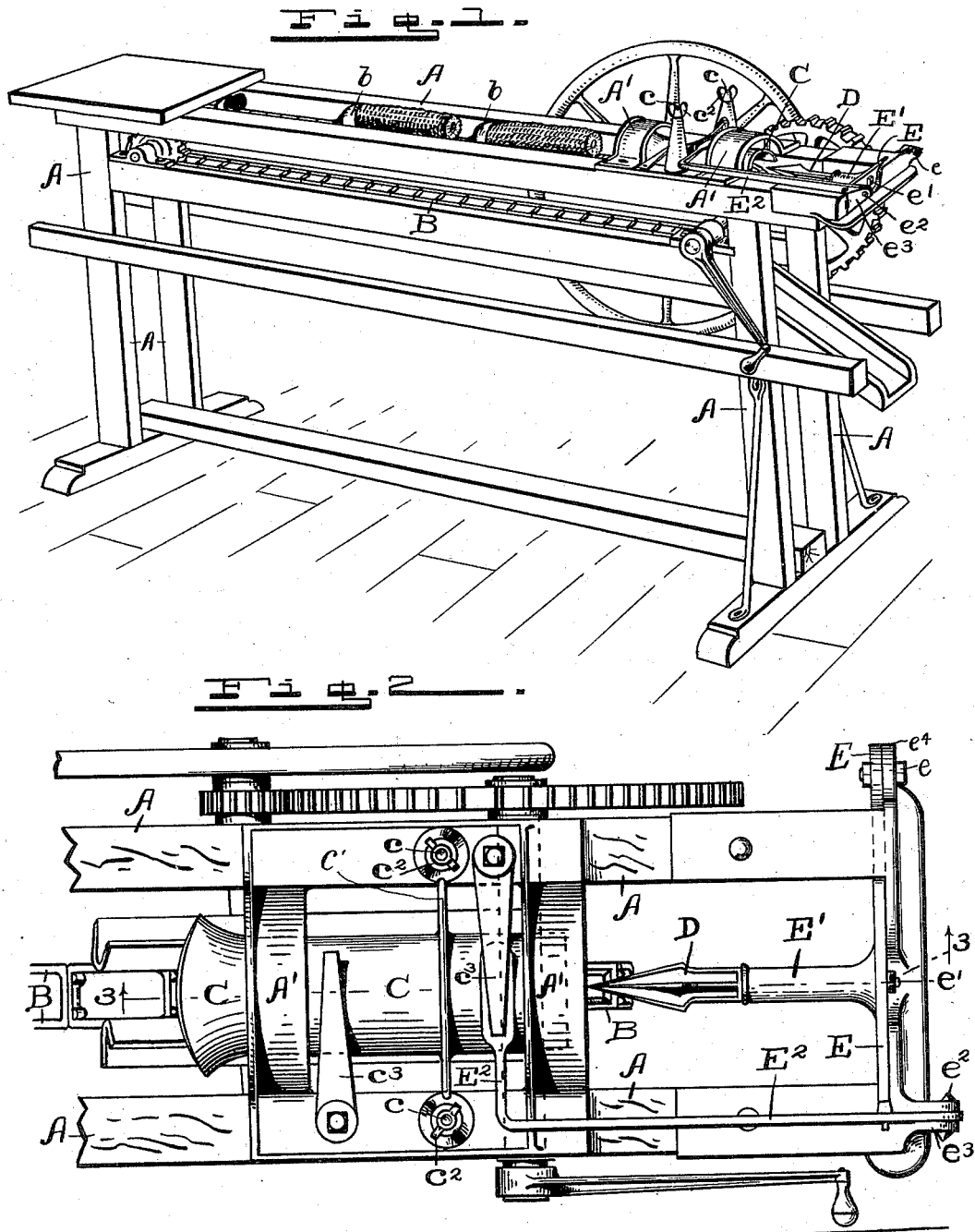

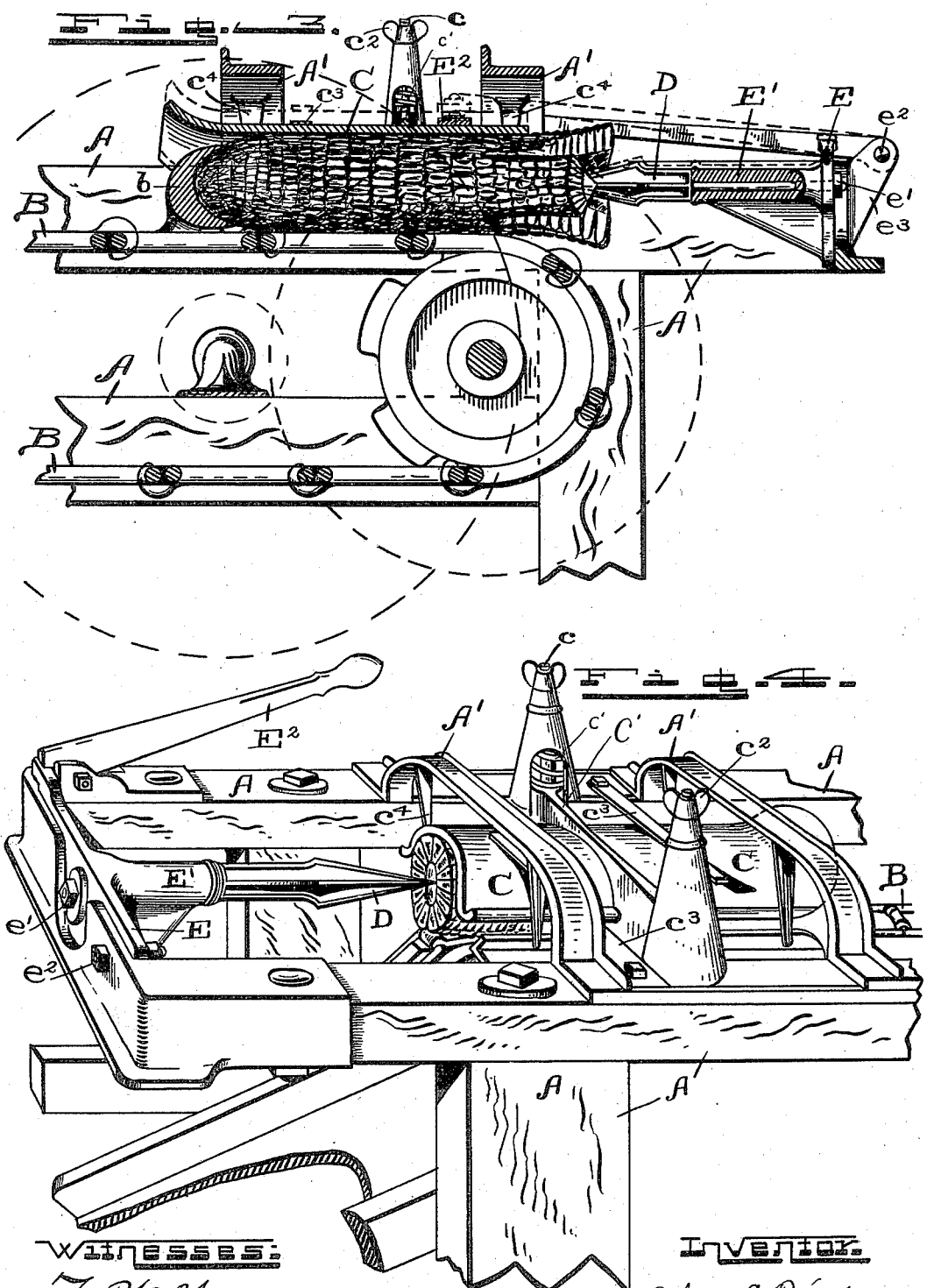

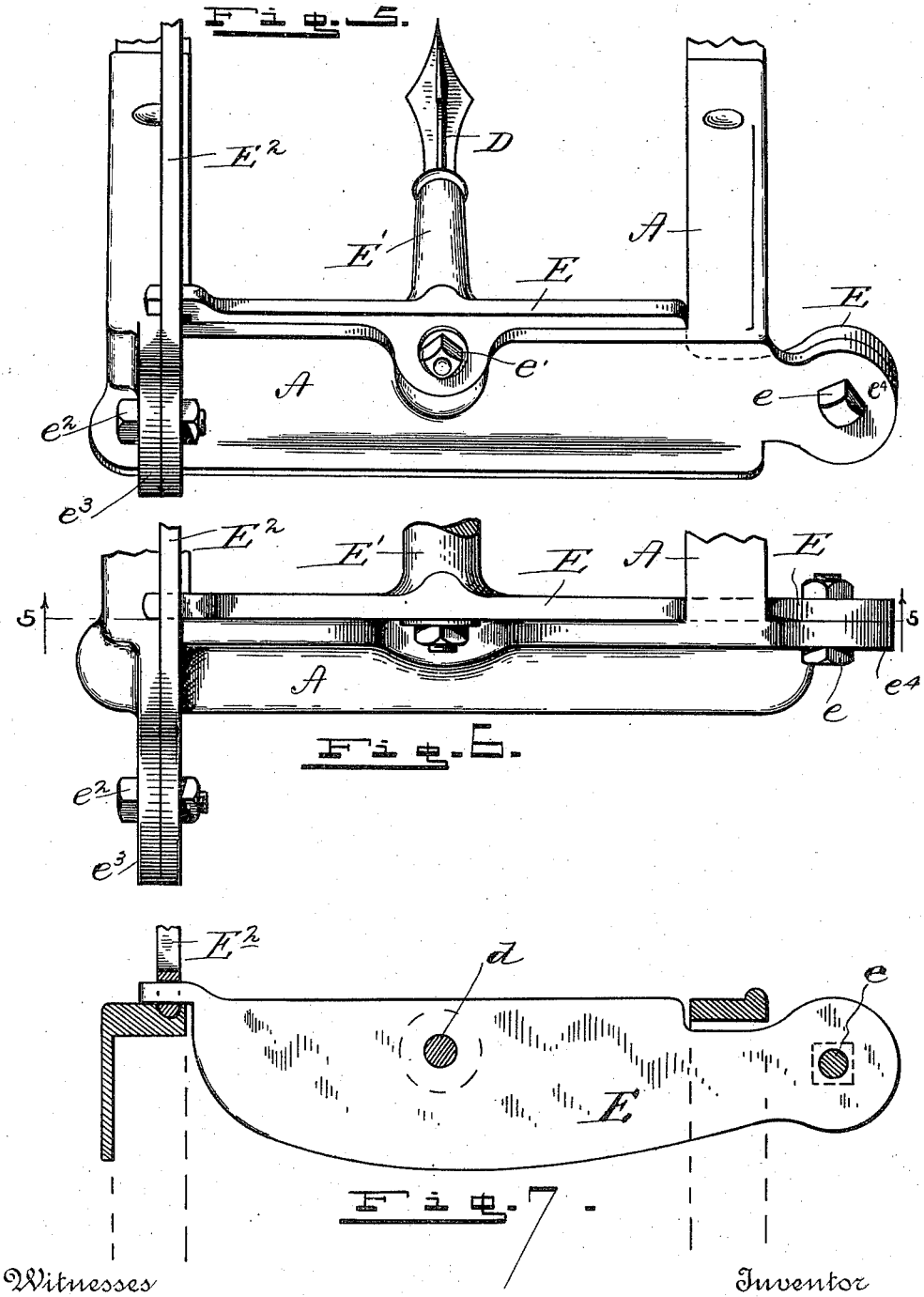

ROBERT E. POINDEXTER, OF INDIANAPOLIS, INDIANA, ASSIGNOR TO EMMAZETTA HICKS, OF SAME PLACE.

CORN-SPLITTING MACHINE.

SPECIFICATION forming part of Letters Patent No. 579,495, dated March 23, 1897.

Application filed November 25, 1896. Serial No. 613,458. (No model.)

*To all whom it may concern:*

Be it known that I, ROBERT E. POINDEXTER, a citizen of the United States, residing at Indianapolis, in the county of Marion and State of Indiana, have invented certain new and useful Improvements in Corn-Splitting Machines; and I do hereby declare the following to be a full, clear, and exact description of the invention, such as will enable others skilled in the art to which it appertains to make and use the same.

My said invention consists in an improved construction and arrangement of parts for mounting and manipulating the splitting-spear of corn-splitting machines, such as is shown in my former patents, Nos. 429,794, 498,887, and 506,440, whereby said spear may be adjusted to strike its point into the center or pith of each ear as it is fed to it, regardless of its size, as will be hereinafter more fully described and claimed.

Referring to the accompanying drawings, which are made a part hereof and on which similar letters of reference indicate similar parts, Figure 1 is a perspective view of a corn-splitting machine the spear whereof is mounted in accordance with my present invention; Fig. 2, a top or plan view of the front end of said machine; Fig. 3, a central longitudinal section through the same on the dotted line 3 3; Fig. 4, a perspective view showing a modified form or arrangement; and Figs. 5, 6, and 7, detail views, on an enlarged scale, showing the front end of the frame of the machine and the manner in which the splitting-spear is mounted more clearly.

The preferable form, as shown in Figs. 1, 2, and 3, is automatically operated to bring the point of the spear to the elevation required, while the modified form shown in Fig. 4 is to be operated by hand, as will be presently described.

In said drawings the portions marked A represent the frame; B, the feeding-chain; C, the spring-mounted top guide; D, the spear, and E the base on which it is mounted.

The frame A is of any suitable form and construction and needs no special description herein.

The feed-chain B, of substantially the form and arrangement shown in my said Patent No. 506,440, is mounted on sprocket-wheels connected with suitable driving mechanism, as shown, and provided with ear-propelling cups $b$, which engage and push forward the ears of corn placed on said chain as in the machine of said patent, in view of which and the clear illustration in the drawings a detail description herein is not necessary.

The top guide C is mounted above the path of the corn with its front end close to the point of the spear. It is formed with a central cross-arm $C'$, formed with vertical eyes in its ends, which are mounted on vertical standards $c$, and springs $c'$ are mounted on said standards between the top of said arm and adjusting-nuts $c^2$ on the top of said standards. By this means said guide is normally held downward and in a position the same distance above the point of the spear as said spear is above the bed on which the ear of corn travels when said spear is in its lowest position, thus insuring that said ear will be firmly held in position. As a further means for holding down said guide at its ends I provide leaf or flat springs $c^3$, one at each end, secured, preferably, to the sides of the frame at one end with the other end extending in and bearing on the top of said guide. Vertical guides $c^4$ are also provided, extending down from the under sides of the braces $A'$ on each side of said guide near each end to keep it steady and in proper position at all times.

The splitting-spear D is of substantially the form shown and described in said patents before mentioned. It is formed of steel and provided with a shank $d$, by which it is mounted in the base provided therefor.

The base E is in the form of a lever hinged at one end to an ear $e^4$ on one side of the frame on the pivot-bolt $e$, the end of said base being extended out through a mortise in the corner of said frame, and said ear formed to extend out to one side sufficiently to give said base the leverage needed, as shown most clearly in Figs. 5, 6, and 7. It is provided with a socket $E'$ on its front to receive the shank of the spear, and connected at its opposite end with an operating-lever $E^2$. The shank $d$ of said spear is mounted in said socket $E'$ and secured therein by means of the nut $e'$ on its threaded outer end. The lever $E^2$ is pivoted at its outer end on a pivot-bolt $e^2$, between ears $e^3$, formed on the corner of the frame, and extends back to a point opposite the forward one of the springs $c^3$, at which point it is bent in to rest on the top of the guide C under said spring, which serves to hold it closely to said guide and insures its movement therewith. The levers are so arranged in regard to their length that the elevation or depression of said guide will operate through them to elevate or depress the point of the spear. Thus the parts being first adjusted so that the point of said spear is opposite the center of the space between the guide and the bed on which the ear of corn travels when in its lowest position, so as to strike the pith of said ear, the feeding in of an ear, which will elevate said guide, be it slightly or considerably, will operate to automatically elevate said point sufficiently to keep it at a point where it will strike said ear in its pith. As the best results can be obtained in operating the machine when the point of the spear always strikes the pith of the ear, the efficiency of the machine is thus greatly enhanced.

In Fig. 4 I have shown a form wherein the lever is to be operated by hand, which may be used, if preferred, as will be readily seen, without departing from my invention.

Having thus fully described my said invention, what I claim as new, and desire to secure by Letters Patent, is—

1. In a corn-splitting machine, the combination, of the mechanism for feeding the ears of corn along, the splitting-spear mounted to be adjusted transversely in relation to the said ears, and means for effecting said adjustment, substantially as set forth.

2. In a corn-splitting machine, the combination, of the feeding devices, the splitting-spear mounted to be adjusted transversely, and means for adjusting said spear automatically, substantially as set forth.

3. In a corn-splitting machine, the combination, of the mechanism for feeding the ears of corn forward, a spring-mounted top guide, a splitting-spear mounted on an adjustable base, and a connection between said base and said guide, whereby as said guide is raised or lowered said base and spear are also raised or lowered, substantially as set forth.

4. In a corn-splitting machine, the combination, of the feeding mechanism, the splitting-spear mounted on a base hinged at one side of said spear, and a lever connected to said base at its other side for operating it, substantially as set forth.

5. In a corn-splitting machine the combination, of the feeding-chain, the adjustable guide, the splitting-spear, the hinged base on which said spear is mounted, the operating-lever connected to said base at or near one end, and to the guide at its other, substantially as set forth.

6. The combination of the feeding mechanism, the spring-mounted guide, the hinged base carrying the splitting-spear, and the operating-lever connected to said base and held to said guide by a spring, substantially as set forth.

In testimony whereof I affix my signature in presence of two witnesses.

ROBERT E. POINDEXTER.

Witnesses:
    DON K. HALL,
    ROBT. W. NEIGHBOR.